US012331756B2

(12) United States Patent
Khoshnevis

(10) Patent No.: US 12,331,756 B2
(45) Date of Patent: Jun. 17, 2025

(54) PUMPS CONFIGURED FOR USE WITH VISCOUS MATERIALS CONTAINING AGGREGATE

(71) Applicant: Contour Crafting Corporation, El Segundo, CA (US)

(72) Inventor: Behrokh Khoshnevis, Marina del Rey, CA (US)

( * ) Notice: Subject to any disclaimer, the term of this patent is extended or adjusted under 35 U.S.C. 154(b) by 0 days.

(21) Appl. No.: 18/030,044

(22) PCT Filed: Oct. 4, 2021

(86) PCT No.: PCT/US2021/071713

§ 371 (c)(1),
(2) Date: May 22, 2024

(87) PCT Pub. No.: WO2022/073040

PCT Pub. Date: Apr. 7, 2022

(65) Prior Publication Data

US 2024/0328421 A1 Oct. 3, 2024

Related U.S. Application Data

(60) Provisional application No. 63/087,159, filed on Oct. 2, 2020.

(51) Int. Cl.

| | |
|---|---|
| ***F04D 7/00*** | (2006.01) |
| ***B01F 27/114*** | (2022.01) |
| ***B01F 27/84*** | (2022.01) |
| ***B01F 27/85*** | (2022.01) |
| ***F04B 15/02*** | (2006.01) |

(Continued)

(52) U.S. Cl.
CPC .............. *F04D 7/00* (2013.01); *B01F 27/114* (2022.01); *B01F 27/84* (2022.01); *B01F 27/85* (2022.01); *F04B 15/02* (2013.01); *F04D 3/02* (2013.01); *F04D 29/181* (2013.01)

(58) Field of Classification Search
CPC . F04D 3/02; F04D 7/00; F04D 29/181; F04B 15/02; B01F 27/114; B01F 27/84; B01F 27/85
See application file for complete search history.

(56) References Cited

U.S. PATENT DOCUMENTS

| | | | |
|---|---|---|---|
| 560,528 | A | 5/1896 | Obermeyer |
| 739,283 | A | 9/1903 | Bonney |

(Continued)

FOREIGN PATENT DOCUMENTS

| | | | | |
|---|---|---|---|---|
| GB | 1270106 A | 4/1972 | | |
| RU | 2563014 C1 | 9/2015 | | |
| WO | WO-0136753 A1 * | 5/2001 | ............. | E02D 5/385 |

OTHER PUBLICATIONS

International Search Report mailed Dec. 29, 2021, in co-pending PCT/US2021/071713.

(Continued)

*Primary Examiner* — Audrey B. Walter
(74) *Attorney, Agent, or Firm* — Risley IP; David R. Risley

(57) ABSTRACT

A pump that includes a rotatable shaft, a material driving apparatus mounted to the rotatable shaft, as well as a conduit in which the rotatable shaft as well as the material driving apparatus are contained, wherein the pump is capable of reliably pumping viscous material through and out of the conduit.

16 Claims, 9 Drawing Sheets

(51) Int. Cl.
*F04D 3/02* (2006.01)
*F04D 29/18* (2006.01)

(56) References Cited

U.S. PATENT DOCUMENTS

| | | | |
|---|---|---|---|
| 2,898,094 | A | 8/1959 | O'Neill, Jr. |
| 3,314,660 | A | 4/1967 | Arbiter |
| 3,318,668 | A | 5/1967 | Ziehl |
| 5,518,312 | A | 5/1996 | Inoue et al. |

OTHER PUBLICATIONS

European Search Report in co-pending EP Application No. 21876721, mailed Sep. 21, 2024.

* cited by examiner

PUMPS CONFIGURED FOR USE WITH VISCOUS MATERIALS CONTAINING AGGREGATE

CROSS-REFERENCE TO RELATED APPLICATION

This application claims priority to U.S. Provisional Application Ser. No. 63/087,159, filed Oct. 2, 2020, which is hereby incorporated by reference herein in its entirety.

BACKGROUND

In conventional concrete construction, the viscosity of the cementitious material that is used is relatively low. In addition, the material's slump (i.e., a measurement of the workability of a material in which the higher the slump, the more workable the material is) is high. Such low-viscosity, high-slump cementitious materials easily fill the cavities of formwork, such as molds, and self-level for conventional applications, such as slab and road making. As low-viscosity, high-slump cementitious materials are relatively easy to pump, there is a wide variety of pumps that can meet the requirements of such applications.

One relatively new application of cementitious materials is in construction-scale three-dimensional (3D) printing, also known as construction 3D printing, which was pioneered by the inventor of the present disclosure over two decades ago. Construction 3D printing is becoming a new industry in construction and numerous universities, research organizations, and companies are developing the technologies necessary to 3D print cementitious materials. Unlike as in conventional concrete construction, construction 3D printing requires the use of high-viscosity cementitious material mixes that have low slump as the material extruded in the 3D printing process is used to form successive layers of material that must maintain their shape without the assistance of formwork.

Currently, progressive cavity pumps, which have helical shafts that rotate within hard rubber stators, are used in construction 3D printing because such pumps, unlike conventional pumps, are capable of pumping viscous material. Unfortunately, progressive cavity pumps consume large amounts of energy, a substantial portion of which being required simply to overcome the friction generated between the shaft and the stator. For example, large, powerful 3-phase motors are often required to pump cementitious material for extrusion through a nozzle of 3D printing apparatus.

In addition, progressive cavity pumps often can only process mortar instead of conventional concrete, which contains relatively large amounts of both fine aggregate (e.g., sand) and coarse aggregate (e.g., gravel), which cannot be accommodated by progressive cavity pumps unless they are very large, in which case they must be driven by diesel engines and are unsuitable for construction 3D printing. As concrete has numerous technical, economical, and environmental advantages over mortar for building construction, the inability to 3D print concrete is one reason the construction 3D printing industry has struggled to compete with the conventional concrete construction industry.

Furthermore, because of the high friction generated by the abrasive materials contained within cementitious materials, including mortar and concrete, the hard rubber stators used in progressive cavity pumps tend to wear out quickly and must be replaced frequently, which slows the construction process and increases its cost.

In view of the above discussion, it can be appreciated that it would be desirable to have pumps suitable for pumping viscous cementitious material that do not suffer from the limitations and disadvantages associated with progressive cavity pumps.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have pumps suitable for pumping viscous cementitious material that do not suffer from the limitations and disadvantages associated with progressive cavity pumps. Disclosed herein are example embodiments of such pumps, which are suitable for construction 3D printing. In each embodiment, the pumps include a material driving apparatus that is mounted to a rotatable shaft that is rotated to rotate the driving component. In some embodiments, the shaft and its driving component are further reciprocated along a longitudinal axis of the shaft so that the driving component is further alternately displaced in opposite directions within the conduit. Unlike progressive cavity pumps, the disclosed pumps are capable of reliably pumping cementitious materials that contain fine and/or coarse aggregates and, therefore, can be used to pump not only mortar but also concrete. Furthermore, the disclosed pumps do not require as much energy to operate and do not wear out as quickly as progressive cavity pumps.

In the following disclosure, various specific embodiments are described. It is to be understood that those embodiments are example implementations of the disclosed inventions and that alternative embodiments are possible. Such alternative embodiments include hybrid embodiments that include features from different disclosed embodiments. All such embodiments are intended to fall within the scope of this disclosure.

As noted above, one type of pump that can be used to pump viscous cementitious material, including concrete, is non-positive displacement pumps. Unlike positive displacement pumps, non-positive displacement pumps do not trap and drive fixed amounts of fluid material. Instead, non-positive displacement pumps enable slippage of material within the pump whenever the opposing pressure increases, for example, due to the material becoming more viscous due to partial curing. Accordingly, the output of non-positive displacement pumps varies depending upon the extent of restrictions that oppose the flow of the material. A first non-positive displacement pump of this disclosure is the double-propeller pump. FIGS. 1-4 illustrate an example embodiment of a double-propeller pump.

Figure 1:
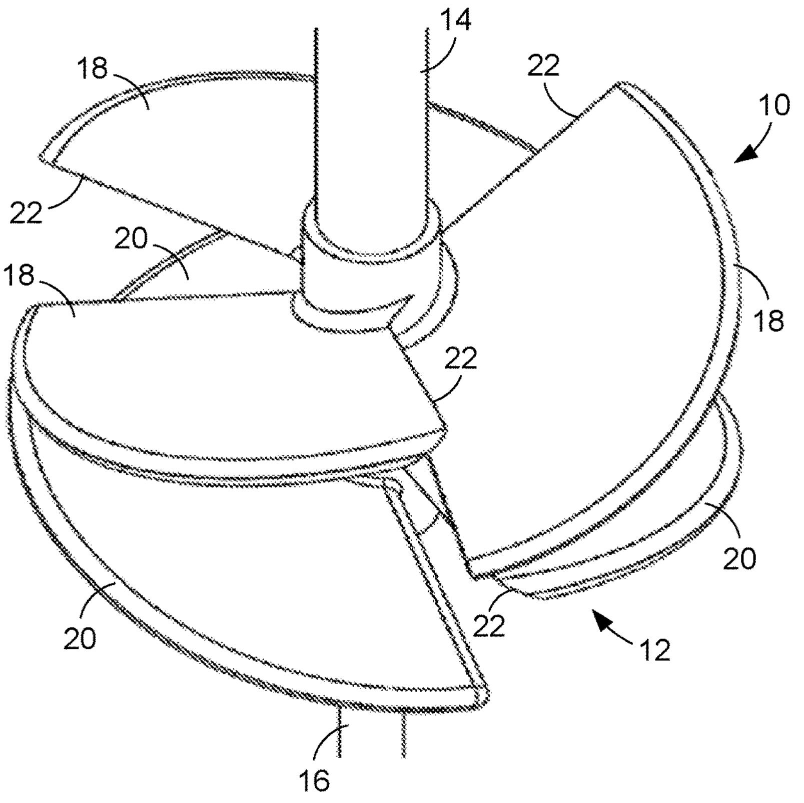
FIG. 1 is a perspective view of an embodiment of propellers of a double-propeller pump.
Figure 2:
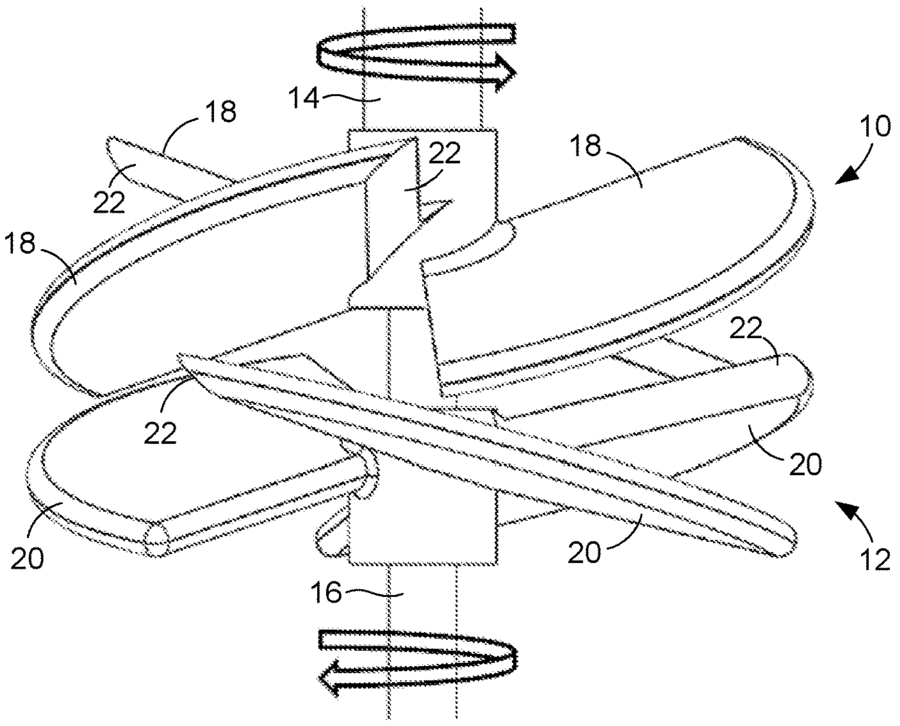
FIG. 2 is a side view of the propellers of FIG. 1.

With reference to FIGS. 1 and 2, illustrated are two propellers that function as a material driving apparatus, including a first or upper propeller 10 and a second or lower propeller 12, that can be provided within a tubular conduit of a double-propeller pump. The upper propeller 10 is mounted to a first or outer shaft 14, while the lower propeller 12 is mounted to a second or inner shaft 16. The inner shaft 16 is coaxially received within and extends through the upper shaft 14 so that, as described below, each shaft and its associated propeller 10, 12 can be rotated in opposite directions during operation of the pump.

In the example of FIG. 1, each propeller 10, 12 comprises multiple generally planar blades, with the upper propeller comprising three blades 18 and the lower propeller comprising three blades 20. Although each propeller 10, 12 is illustrated as comprising three blades 18, 20, it is noted that a lesser or greater number of blades could be used, if desired. Each blade 18, 20 is angled relative to the shaft 14, 16 with which it is associated and includes a relatively sharp leading edge 22 that is configured to slice through the cementitious material that is to be pumped. In the illustrated embodiment, each leading edge 22 is beveled to serve that purpose. As is most clearly apparent in FIG. 2, the propellers 10, 12 are positioned in close proximity to each other such that there is little clearance between the blades 18 of the upper propeller and the blades 20 of the lower propeller. Generally speaking, the clearance between the blades 18, 20 is only slightly larger (e.g., 1-2 mm larger) than the size of the largest aggregates within the material to be pumped.

As can be appreciated from both FIGS. 1 and 2, the blades 18 of the upper propeller 10 are angled in an opposite direction as compared to the blades 20 of the lower propeller 12. This enables the propellers 10, 12 to be rotated in opposite directions and still drive the cementitious material in the same (e.g., downward) direction. In particular, as depicted in the example of FIG. 2, the outer shaft 14 upon which the upper propeller 10 is mounted can be rotated in a first angular direction (counterclockwise when viewed from above) and the inner shaft 16 upon which the lower propeller 12 is mounted can be rotated in a second, opposite angular direction (clockwise when viewed from above).

The opposing rotation of the propellers 10, 12 facilitates pumping of cementitious materials, such as mortar and concrete. When a viscous material, especially one that contains abrasive particles like cementitious material, is to be driven through a conduit, the friction between the material and the walls of the conduit must be higher than the friction between the material and the surfaces of the propeller blades. If this condition is not satisfied, the material surrounding the blades tends to rotate with the propeller instead of being driven forward through the conduit. Unfortunately, that is typically the case when a single propeller is used to drive the material. One remedial approach is to create opposition to the rotation of the material. Such opposition is created when two closely spaced propellers having opposing blade angles are rotated in opposite directions as depicted in FIG. 2. In such a case, the friction between the two volumes of adjacent materials rotated by the two propellers 10, 12 impedes the rotation of the volumes around the propellers and, therefore, the blades 18, 20 of both propellers can more effectively drive the material forward through the conduit in which they are provided.

The efficiency and/or power consumption of the double-propeller pump can be increased by applying high-frequency vibration to the propellers, which could significantly reduce the friction between the propellers and the abrasive material. In some embodiments, this can be achieved using a vibration generator, such as a ultrasonically vibrating horn that transmits high-frequency, low-amplitude vibration to the propeller blades through the pump shafts. It is noted that such vibration could be implemented in each of the disclosed pump embodiments to improve their efficiency and/or power consumption.

In addition to facilitating forward movement of viscous material, the double-propeller configuration also facilitates the pumping of relatively large aggregate that may be contained in the material given that, as is most easily apparent in FIG. 2, there are large open spaces between the blades 18, 20 of each propeller 10, 12, which enable larger particles to pass. The size of the particles that the double-propeller pump can pass depends upon the size of the pump.

Figure 3:
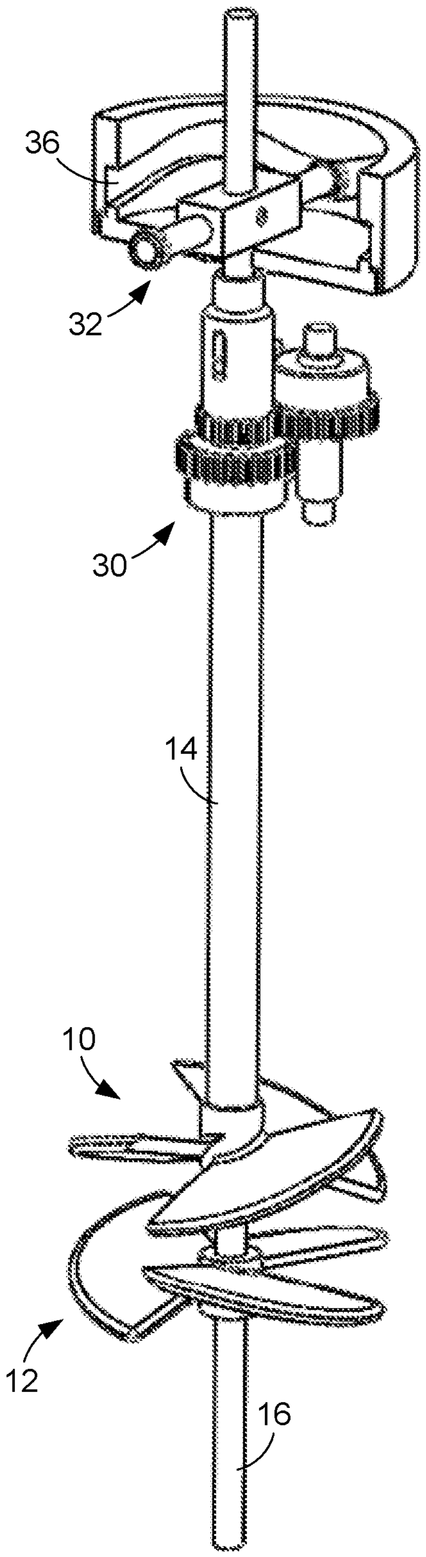
FIG. 3 is a perspective view of an example implementation of the propellers of FIG. 1.

It is noted that a rotating propeller would have the added pumping action of a piston that can drive material forward by its linear displacement if the shaft of the propeller were pushed in the direction of material flow. In other words, a rotating propeller that also moves forward in the direction of material flow can provide a higher flow rate and higher pumping pressure as compared to one that only rotates. This phenomenon can be exploited in a double-propeller pump by reciprocating one or both of the propellers of the pump. FIG. 3 illustrates a case in which the lower propeller 12 is reciprocated up and down simultaneous to propeller rotation.

As shown in FIG. 3, a reverser gear set 30 can be used for the creation of counter-rotation action. In particular, due to the provision of the reverser gear set 30, when the outer shaft 14 (and its propeller 10) is rotated in a first angular direction, the inner shaft 16 (and its propeller 12) rotates in a second, opposite angular direction. In addition, a double-ended rotating follower 32 is mounted to the inner shaft 16 and provided within a cylindrical cam 34 having a sinusoidal inner groove 36 along which the follower travels as the inner shaft is rotated. This cam-follower apparatus causes the inner shaft 16 and the lower propeller 12 mounted to it to reciprocate up and down as the shaft is rotated, which increases the material flow rate.

It has been determined through experimentation that, in the case of viscous material containing abrasive particles, if the ratio of the speed of the linear backward movement of a propeller to its rotation speed is smaller than a threshold, the backward movement of the propeller does not appreciably reduce the forward flow of material. However, the forward motion of the propeller effectively significantly increases the flow. The efficiency is even higher if the reciprocation has a lower linear backward speed than the speed of forward movement. This is due to the fact that the friction between the particulate material and a hard rubber lining within the pump housing is less at higher speeds, much like the braking friction between a road and a car tire, which is less at higher car speeds. In other words, when the propeller reciprocates backward, the material has a lesser tendency to move back with the propeller.

Although such reciprocation increases the flow of viscous material, including cementitious material containing fine and coarse aggregates, natural flow pulsation may occur as a consequence of the reciprocation. It is noted that this pulsation effect can be reduced or eliminated using a dampener installed between the propeller set and the material outlet. In some embodiments, such a dampener can comprise a diaphragm acted upon by a tension-adjustable spring for adjusting the dampening pressure proportional to the material pressure variations. Such a diaphragm can be installed at an opening on the outlet side of the pump housing.

Figure 4:
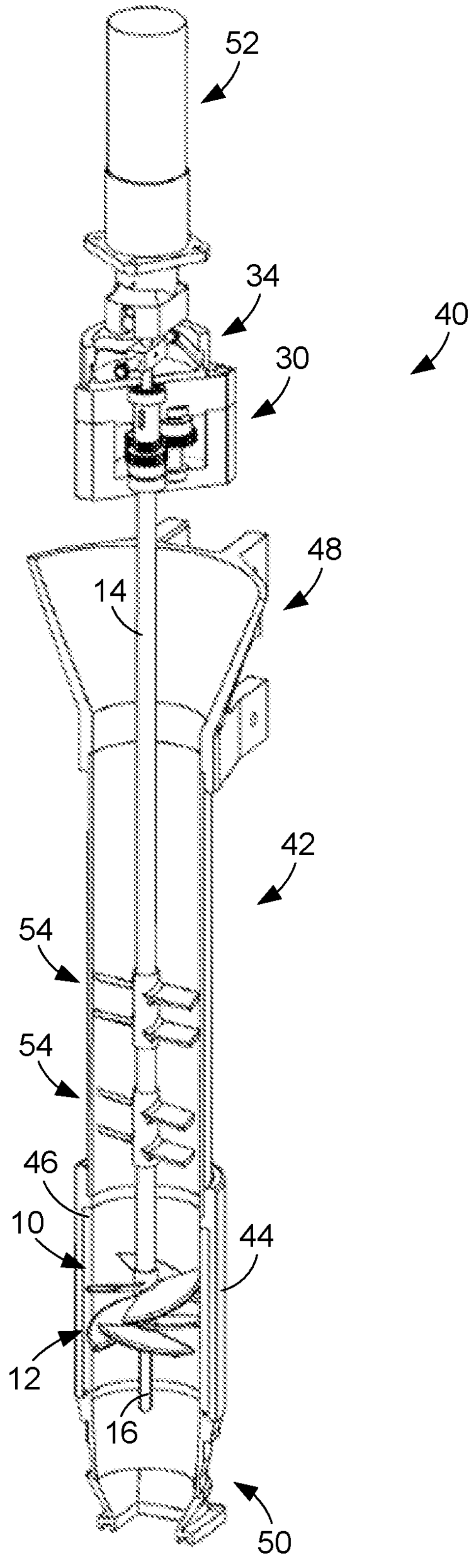
FIG. 4 is a perspective cross-sectional view of an embodiment double-propeller pump that incorporates the propellers of FIG. 1.

FIG. 4 illustrates an embodiment of a complete double-propeller pump 40. As shown in the figure, the propellers 10, 12 and the shafts 14, 16 are provided within a cylindrical pump barrel 42. The barrel 42 includes a removable propeller section 44 in which the propellers 10, 12 are positioned. As shown in FIG. 4, the propeller section 44 includes a hard rubber lining 46 that prevents blade jamming when large aggregates are contained within the material mix. Mounted to the top of the barrel 42 is a frustoconical hopper 48 in which the material to be pumped can accumulate, while mounted to the bottom of the barrel is an outlet nozzle 50 through which the pumped material is extruded. In the example of FIG. 4, the nozzle 50 has a rectangular (e.g., square) cross-section. Also shown in FIG. 4 is a motor 52 that rotates the inner shaft 16, which in turn rotates the outer shaft 14 due to the operation of the reverser gear set 30. As only gravity drives the material contained within the hopper 48 down through the barrel 42, a set of simple narrow agitator blades 54 can be mounted to the outer shaft 14 above the propellers 10, 12 to agitate thick and/or sticky viscous material and break it loose from the pump barrel inner walls to enable the material to slide down onto the top propeller.

An alternative configuration of the double-propeller pump is one in which one of the propellers is stationary and, therefore, does not rotate. Although a stationary propeller is not as efficient as a rotating one, it still can provide resistance against rotation of the material volume positioned between the two propellers and, therefore, increase the flow rate. In such a case, the blades of the stationary propeller can be fixedly mounted to the inner walls of the pump barrel. Multiple pairs of rotary/stationary propellers could be provided inside a longer pump barrel. In such a case, all of the rotary propellers could share the same shaft, which could extend through center holes of the stationary propellers.

A further non-positive displacement pump of this disclosure is the hollow-core auger pump. Augers have been used for centuries to move material. As with propellers, the friction between a material and the walls of a conduit through which it is to be driven must be higher than the friction between the material and the surfaces of the auger or the material surrounding the auger will tend to rotate with the auger instead of moving forward. This is especially the case for longer augers that normally exert more forward driving force than shorter augers. It has been determined, however, that this friction problem can be overcome by using a hollow-core auger, i.e., an auger in which the central axial core of the auger is omitted such that only the outer portion of the auger is present. In such a case, the auger has much less surface area and, therefore, generates much less friction with the material to be moved than a conventional, solid-core auger would. When implemented, a hollow-core auger scrapes the material off the walls of the conduit in which the auger is provided and pushes that material forward. Although there is no core to drive the portion of the material within the hollow core of the auger, it has been empirically determined that this material moves along with the portion of material that has been scraped from the conduit walls due to the high friction between the two material portions.

Figure 5:
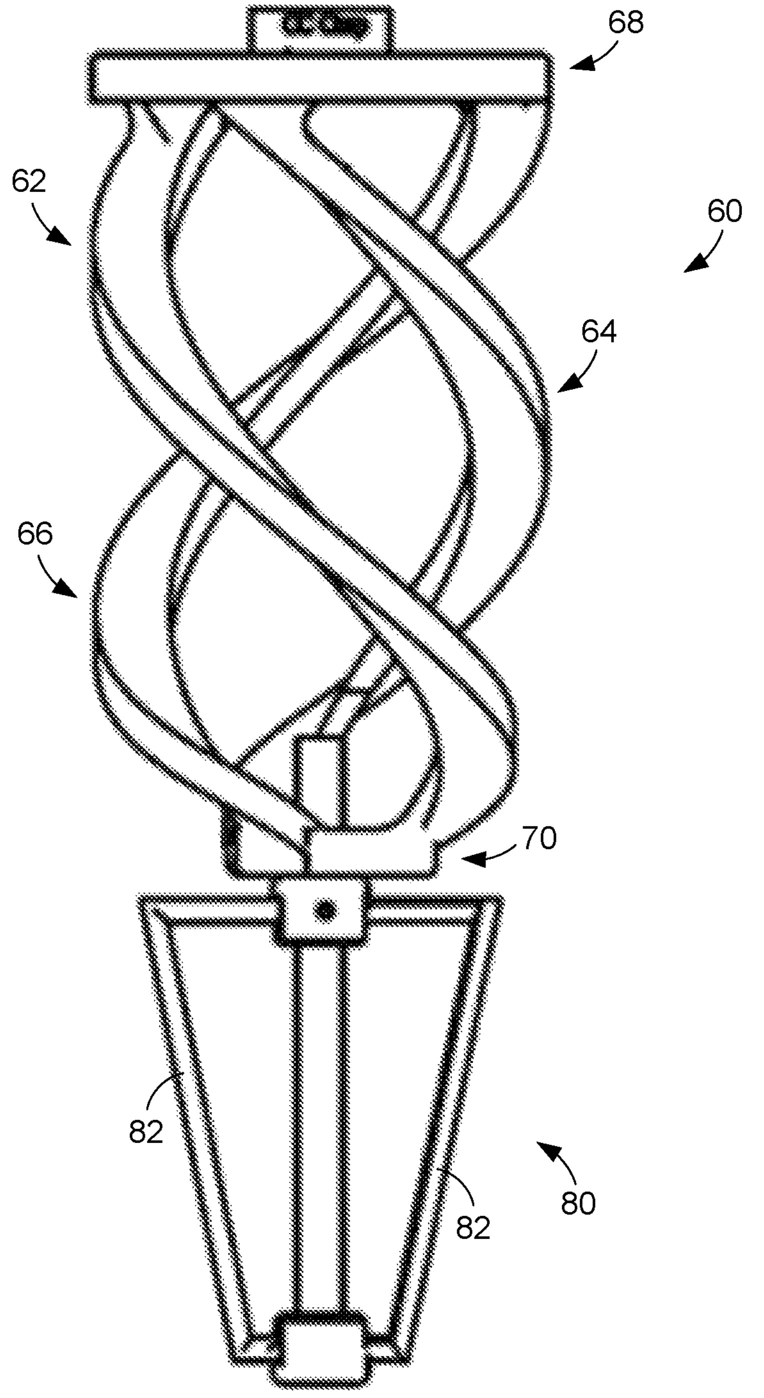
FIG. 5 is a side view of an embodiment of a hollow-core auger of a hollow-core auger pump.
Figure 6:
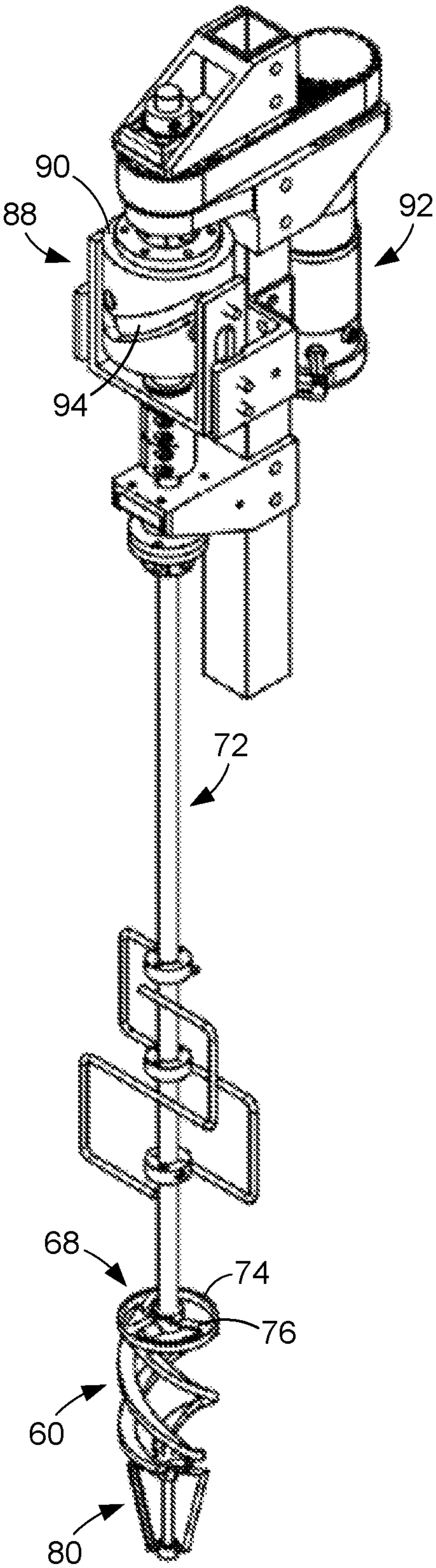
FIG. 6 is a perspective view of an example implementation of the hollow-core auger of FIG. 5.

FIG. 5 illustrates an embodiment of a hollow-core auger 60 that functions as a material driving apparatus. As shown in the figure, the auger 60 actually combines three hollow-core auger blades 62, 64, and 66 that originate from a first or upper mounting element 68 and terminate in a second or lower mounting element 70. While three blades 62-64 are used in the example embodiment of FIG. 5, a lesser or greater number of blades could be used, if desired. The upper mounting element 68 can be mounted to the distal end of a rotatable shaft 72 of a pump in which the hollow-core auger 60 is used, as shown in FIG. 6. As depicted in that figure, the upper mounting element 68 is configured as an open ring 74 that is connected to the shaft 72 with a few radial spokes 76 so that material can pass through the mounting element and into the hollow core of the auger 60.

Referring back to FIG. 5, each of the blades 62-66 is configured as a helical auger blade that does not comprise an axial core. That is, whereas a typical auger blade extends radially outward from a central shaft to an outer diameter of the blade, the material of the blades 62-66 only extends a limited distance inward from the outer diameter and there is no central shaft. Accordingly, each blade 62-66 has a relatively narrow radial width that is defined by the distance between an outer diameter of the blade and an inner diameter of the blade, and each blade defines a central, open space that can receive material to be pumped. As is apparent from FIG. 5, the outer diameter of each blade 62-66 can decrease near the bottom mounting element 70 as compared to near the upper mounting element 68 such that the hollow-core auger 60 has a generally tapered shape when viewed from the side as in FIG. 5.

Figure 7:
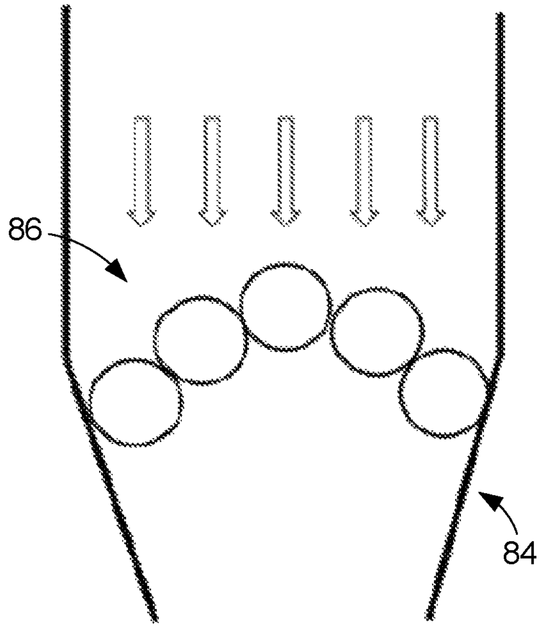
FIG. 7 is a schematic side view of a nozzle of a construction 3D printing system illustrating clogging of the nozzle with aggregate.

In the embodiment of FIG. 5, mounted to the bottom of the hollow-core auger 60 is a clog breaker 80 having multiple blades 82 that rotate along with the auger and break up formations of arcs or bridges composed of aggregates within the output nozzle of the pump. FIG. 7 illustrates an example of such clogging within a nozzle 84. In this example, a few aggregates have formed an arc or bridge 86 that resists the pressure of the material above it and blocks material from being extruded from the nozzle 84. The higher the material flow pressure, the stronger the side forces that are exerted by the aggregate against the walls of the nozzle 84. When provided, the clog breaker 80 prevents such accumulations from forming. Notably, a clog breaker similar to that shown in FIG. 5 can be used in any of the pump embodiments disclosed herein.

As in the case of double-propeller pump, the efficiency of the hollow-core auger pump can increase appreciably if the auger is reciprocated, even by a small amount, along its central vertical axis. Such reciprocation can be effected using a cam-follower apparatus, such as the apparatus 88 shown in FIG. 6. In this example, a cam 90 is mounted to the shaft 72. As the shaft 72 is rotated by a motor 92 of the pump, the cam 90 is rotated and reciprocates up and down as followers (not visible) of the apparatus 88 travel along a sinusoidal groove 94 formed in the cam. Notably, the efficiency of the reciprocation is higher if the reciprocation has a lower backward linear movement speed than its speed of forward linear movement.

As noted above, another type of pump that can be used to pump viscous cementitious material, including concrete, is positive displacement pumps. One positive displacement pump of this disclosure is the hybrid auger-piston pump, an example of which is illustrated FIGS. 8 and 9. A conventional auger pump, such as the type used in meat grinders, is not a positive displacement pump because, in even the best configuration, the flow rate of the material is not directly proportional to the rotation speed of auger and, in cases in which there is opposing pressure provided by a narrow outlet nozzle, the flow may completely stop, even for high auger rotation speeds. Such flow stoppage becomes more likely for viscous material containing abrasive particles, as is the case of wet concrete paste.

Positive displacement pumping can provide predictable and consistent flow rates that are required for construction 3D printing. A piston pump is an example of such positive displacement pump. Conventional piston pumps typically include two check valves: an inlet valve that opens when material is sucked in by the piston and that closes when the gathered material is to be driven forward, and an outlet valve that closes when the material is sucked in and that opens when the material is driven forward. While such piston pumps are commonly used for pumping large volumes of high-slump, runny concrete into formwork at construction sites, these pumps are not suitable for viscous materials that contain abrasive particles because excessive force would be required to pass the viscous and abrasive material through the restrictive openings of the check valves. Furthermore, the restrictive opening of the outlet valve may restrict the passage of aggregate and clog the pump. If such a clog occurs and the concrete cures inside the pump, the pump may be unrepairable.

Figure 8:
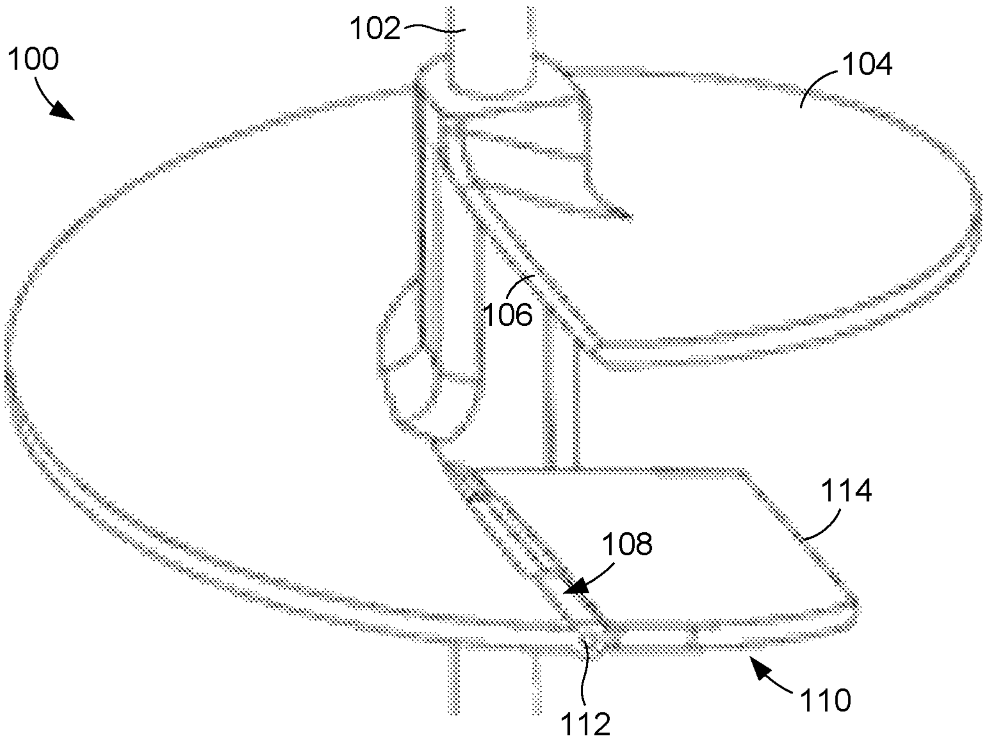
FIG. 8 is a perspective view of an embodiment of a hybrid auger-piston of a hybrid auger-piston pump.

It has been determined, however, that a cementitious material can be extruded at accurate and predictable flow rates using a positive displacement pump comprising a hybrid auger-piston that incorporates a check valve. FIG. 8 illustrates such a hybrid auger-piston 100 mounted to a shaft 102. The auger 100 functions as a material driving apparatus and is configured as a single-pitch auger in which the blade 104 of the auger passes through a single 360° rotation. As shown in FIG. 8, the blade 104 includes a leading edge 106 and a trailing edge 108. As with the leading edges of the blades of the propellers described in relation to FIGS. 1 and 2, the leading edge 106 can be relatively sharp so as to be configured to slice through the cementitious material that is to be pumped.

The hybrid auger-piston 100 comprises an integrated check valve that includes a planar flap 110 that is pivotably mounted to the trailing edge 108 of the blade 104. In FIG. 8, the flap 110 is shown in a first or open orientation in which the flap has been pivoted downward such that the flap acts as an extension of the blade. While in this configuration, the flap 110 enables material surrounding the blade 104 to pass through auger 100 as with a conventional auger because of the vertical space between the leading edge 106 and the trailing edge 108 of the blade. The flap 110 can also be pivoted upward about a pivot axle 112 until the trailing edge 114 abuts the underside of the blade 104 near its leading edge 106 so as to be placed in a second or closed orientation in which material surrounding the blade 104 cannot pass through auger 100 because the flap closes the vertical space between the leading edge and the trailing edge 108 of the blade. As described below, the flap 110 automatically opens or closes depending upon axial rotation and vertical reciprocation of the auger 100.

Figure 9C:
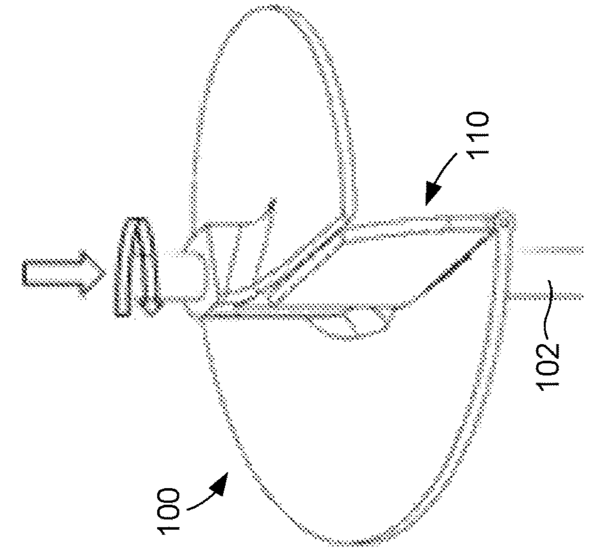
FIGS. 9A-9C are sequential perspective views of the hybrid auger of FIG. 8 illustrating operation of the auger.
Figure 9B:
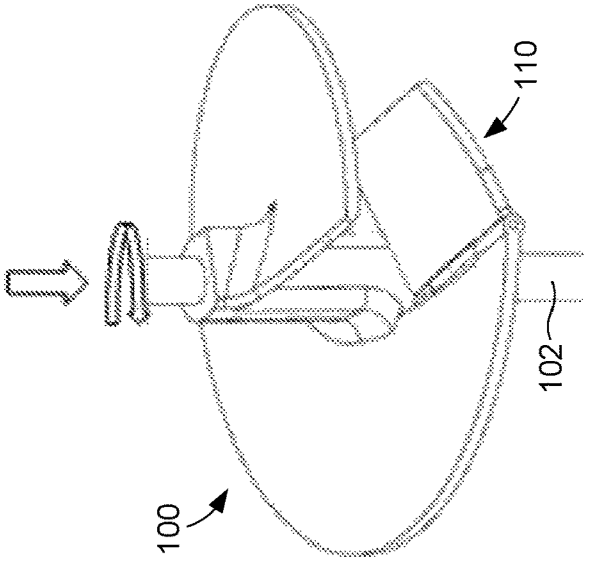
Figure 9A:
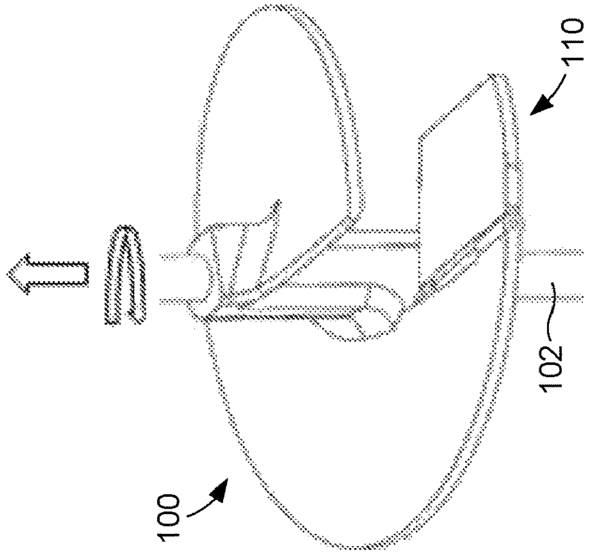

FIGS. 9A-9C are sequential views of the hybrid auger-piston 100 at different points of operation of a hybrid auger-piston pump in which the auger is provided. Beginning with FIG. 9A, as the auger 100 is rotated in the clockwise direction (as viewed from above) and is simultaneously moved upward, the auger cuts into the material above it, and moves some of the material below it. Because of the rotation of the auger 100, the material the auger cuts into moves the flap 110 into the open orientation (i.e., the check valve opens). The auger 100 is then driven downward and the material below the auger automatically pivots the flap 110 to the closed orientation, as illustrated in FIGS. 9B and 9C (i.e., the check valve closes) and the auger drives the material below it forward as would a conventional piston. Significantly, the auger 100 does not pull much material upward during its upward stroke because it cuts through the viscous material as it rises, much like a screw that is driven upward into a piece of wood. With the above-described operation, the auger 100 acts as a conventional auger in its upward motion, but it acts as a piston in its downward motion. It is noted that, although the auger 100 rotates during the downward motion, this rotation neither performs a useful nor a harmful function for pumping of viscous, abrasive materials.

Figure 10A:
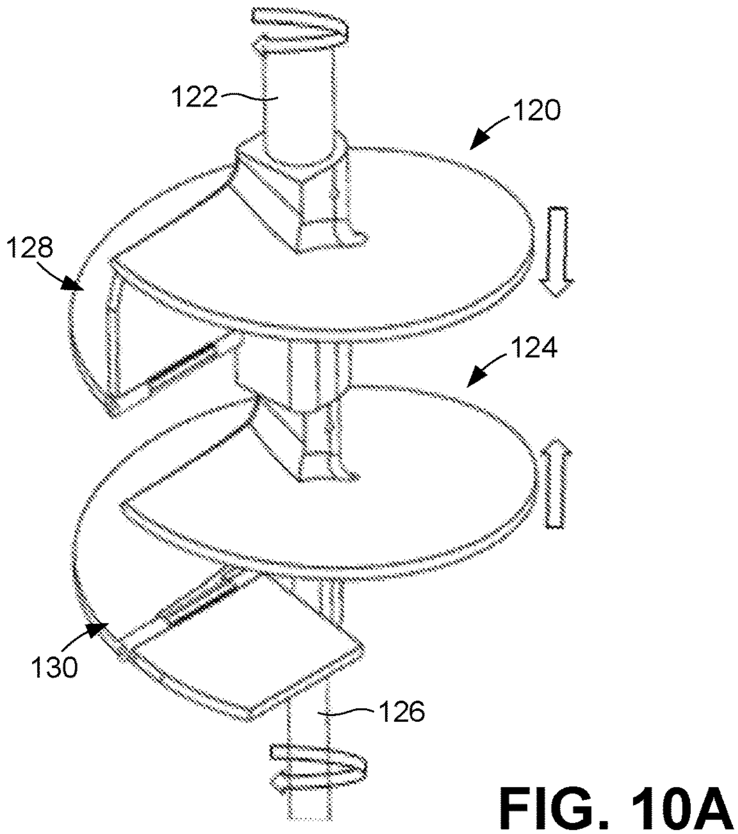
FIGS. 10A and 10B are sequential perspective views illustrating operation of an embodiment of a hybrid auger pump comprising two hybrid augers.
Figure 10B:
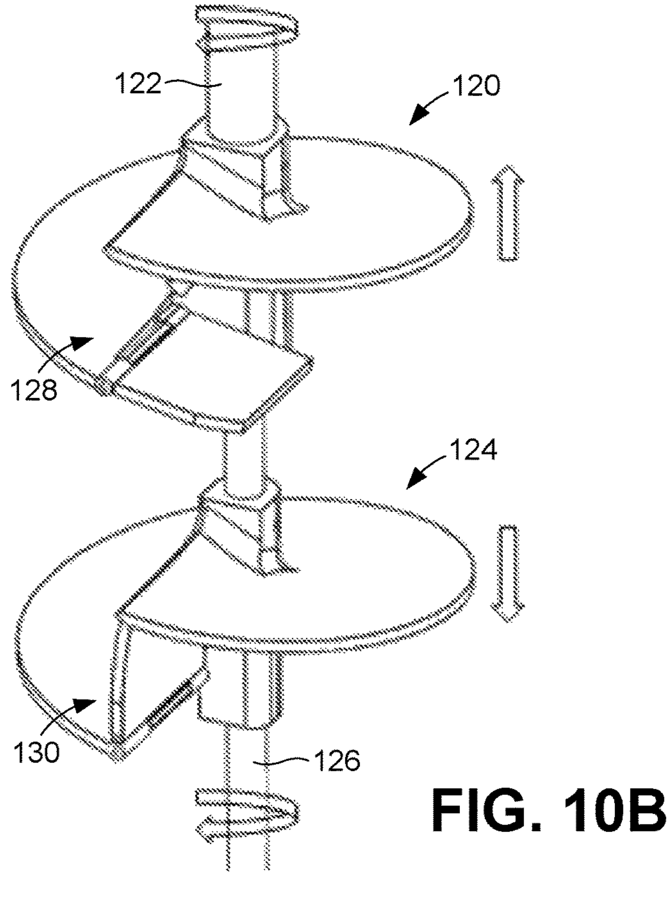

Because the hybrid auger-piston 100 reciprocates, the flow created by the auger is pulsatile. Specifically, the auger 100 drives the material downward during its downward stroke but the material remains stagnant during the auger's upward stroke. To enable continuous flow, a double hybrid auger-piston system can be used in which the two augers rotate in the same direction but vertically reciprocate in opposite directions. FIGS. 10A and 10B illustrate such an embodiment. As shown in these figures, a first or upper hybrid auger-piston 120 is mounted to a first or outer shaft 122, and a second or lower hybrid auger-piston 124 is mounted to a second or inner shaft 126 that extends through the outer shaft.

In FIG. 10A, the upper hybrid auger-piston 120 is being displaced downward as the lower hybrid auger-piston 124 is being displaced upward. Because of this, the check valve 128 of the upper hybrid auger-piston 120 is closed and the check valve 130 of the lower hybrid auger-piston 124 is open. Accordingly, the upper hybrid auger-piston 120 is driving material downward while the lower hybrid auger-piston 124 is cutting into material. In FIG. 10B, however, the opposite is occurring. That is, the upper hybrid auger-piston 120 is being displaced upward, its check valve 128 is open, and it is cutting into material, while the lower hybrid auger-piston 124 is being displaced downward, its check valve 130 is closed, and it is driving material downward. With such operation, one of the hybrid auger-pistons 120, 124 is always driving material forward and, therefore, constant flow is achieved.

The above-described operation can be achieved by providing a cam-follower apparatus or other mechanism that can provide uniform reversing linear motion. For example, a first cam-follower apparatus can be rotated by a motor and a second cam-follower apparatus can be rotated by the first cam-follower apparatus by means of a sliding mechanical linkage.

Figure 11A:
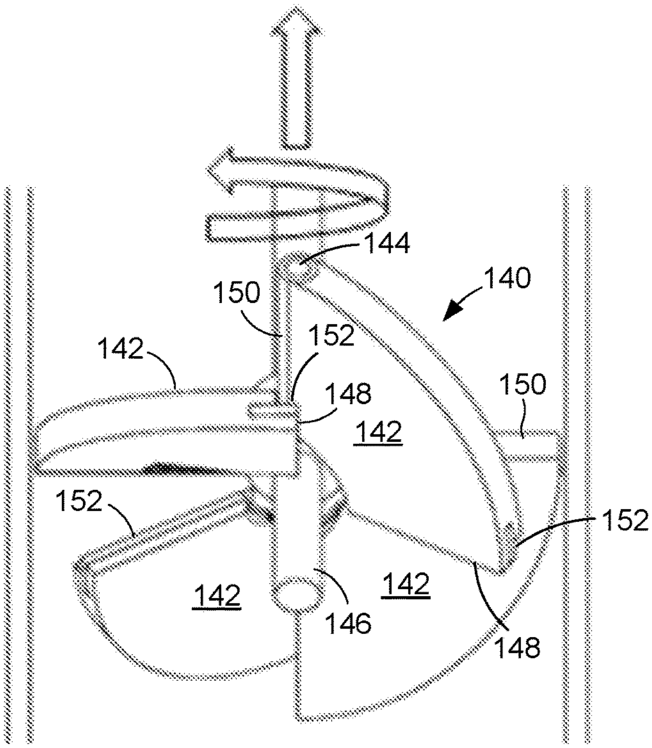
FIGS. 11A and 11B are sequential perspective views illustrating operation of an embodiment of a multi-valve piston of a multi-valve piston pump.
Figure 11B:
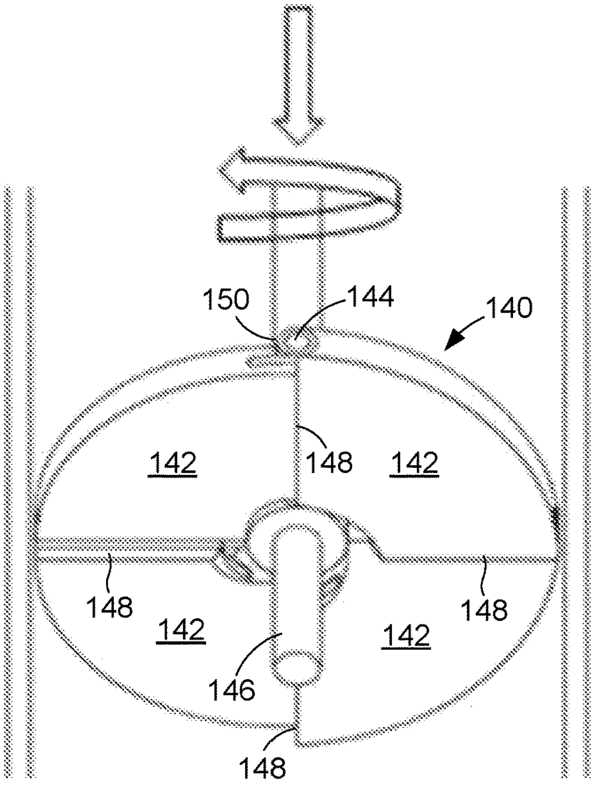

A further positive displacement pump of this disclosure is a multi-valve piston pump. Such a pump uses a multi-valve piston that functions as a material driving apparatus that is formed by one or more check valves. FIGS. 11A and 11B illustrate an embodiment of a multi-valve piston 140 that can be used in such a pump. As shown in those figures, the piston 140 is formed by multiple check valves, each comprising a planar, partially circular flap 142 that is pivotally mounted to a pivot axle 144 that extends radially outward from a shaft 146. In the example of FIGS. 11A and 11B, there are 4 partially circular flaps 142 (a quad-valve configuration) with each flap forming a quarter of a circle. The flaps 142 can be made of metal, hard rubber, or metal coated with soft or medium-hard rubber. The rubber or rubber-coated options offer improved sealing as well as ease of cleaning.

In a first or open orientation of the multi-valve piston 140 shown in FIG. 11A, each flap 142 is pivoted downward so as to form large openings between the flaps through which material can pass. In a second or closed orientation of the multi-valve piston 140 shown in FIG. 11B, each flap 142 is pivoted upward so as to contact adjacent flaps and form an integrated, substantially planar disc operable as a piston that can be used to drive material forward through the pump as would a conventional piston. In some embodiments, each flap 142 has a trailing edge 148 that contacts a leading edge 150 of an adjacent flap when the multi-valve piston 140 is in the closed orientation. In such cases, the trailing edge 148 of each flap 142 can have a recess 152 that extends along the edge that enables the flaps to nest with each to form a relatively flat member.

Operation of the multi-valve piston 140 is similar to that of the hybrid auger-piston described above in relation to FIGS. 9A-9B. With reference to FIG. 10A, as the multi-valve piston 140 is rotated in the clockwise direction (as viewed from above) and is simultaneously moved upward, material to be driven forward pivots each flap 142 into its open orientation and the material passes through the check valves, essentially loading the piston with material to drive forward. Once the piston 140 has been so loaded, the piston is then moved downward as shown in FIG. 10B, the flaps 142 are pivoted into the closed orientation, and the material that had passed through the piston is driven downward.

Although conventional piston pumps have been used in numerous pump designs, the restrictive size of their check valves make them unsuitable for use with viscous materials that contain coarse aggregates. The multi-valve piston 140 overcomes those problems, however, as each check valve opens wide to enable even large aggregate to pass through the piston. In addition to enabling pumping of concrete, the check valves dramatically reduce the energy consumption of the pumping process, which makes construction 3D printing an attractive alternative to conventional concrete construction. Notably, in cases in which the multi-valve piston pump is to be used to pump lower viscosity materials and/or materials that do not include abrasive materials, there may be no need to rotate the multi-valve piston. Instead, the piston can simply be reciprocated along the direction of the axis of a non-rotating shaft to which the piston is mounted.

Figure 12A:
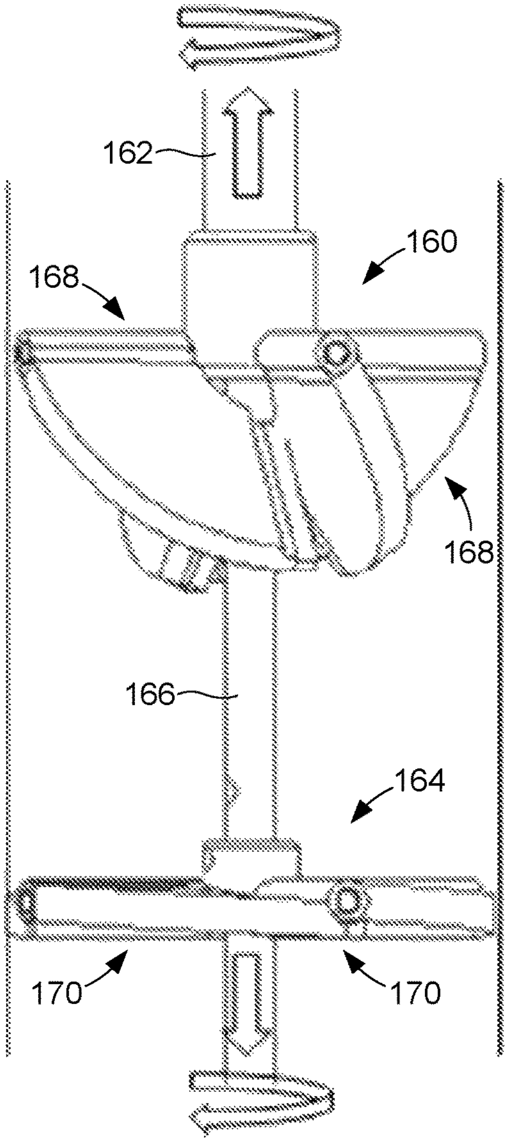
FIGS. 12A and 12B are sequential side views illustrating operation of an embodiment of a multi-valve piston pump comprising two multi-valve pistons.
Figure 12B:
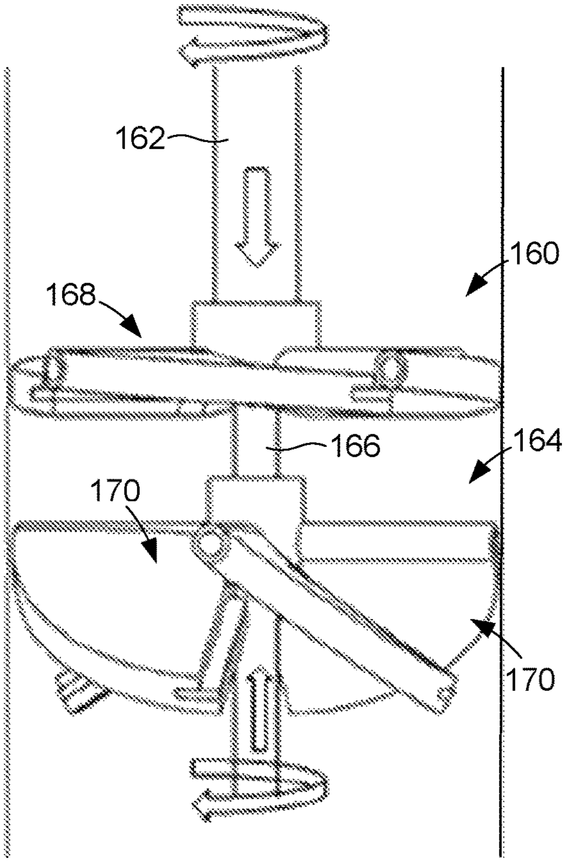

In some cases, a suction force may be required to open the valves. Such a suction force can be created using a double-piston arrangement. A double-piston arrangement also has the added advantage of enabling continuous flow for the pump output. FIGS. 12A and 12B illustrate an example of such an arrangement. In this embodiment, a first or upper multi-valve piston 160 is mounted to a first or outer shaft 162 and a second or lower multi-valve piston 164 is mounted to a second or inner shaft 166 that extends through the outer shaft.

In FIG. 12A, the upper multi-valve piston 160 is being displaced upward as the lower multi-valve piston 124 is being displaced downward. Because of this, the check valves 168 of the upper multi-valve piston 160 are open and the check valves 170 of the lower multi-valve piston 124 are closed. Accordingly, the upper multi-valve piston 160 is collecting material while the lower multi-valve piston 124 is driving material. In FIG. 12B, however, the opposite is occurring. That is, the upper multi-valve piston 160 is being displaced downward, its check valves 168 are open, and it is driving material downward, while the lower multi-valve piston 124 is being displaced upward, its check valves 170 are closed, and it is collecting material. With such operation, one of the multi-valve pistons 160, 164 is always driving material forward and, therefore, constant flow is achieved.

It is noted that, depending on the speed of rotation, the valve closure can be nearly instantaneous and the closure of the valves would not need any linear displacement of the valve set. The rapid valve response results in better flow rate accuracy. It is also noted that the rotary motion enables the valves to completely close even when pumping a material mix that has a high concentration of large aggregates. This is true because rotation of each valve's leading edge cuts through the material and, if it hits a large aggregate, it will push the aggregate on one side of the valve or the other while constantly trying to reach the closed state. In this arrangement, the chance of an aggregate jamming a valve and preventing its closure is highly improbable.

According to the above facts, a combination of linear displacement with simultaneous rotation of the valve set can result in very responsive check valves that nearly instantaneously switch from the open to the closed orientation when the piston transitions to the driving mode. In the pulling (suction) mode, the force of the incoming material caused by suction overpowers the force caused by rotation that would normally close the valves, hence the valves open and material passes downstream. The combination of linear and rotary motion of the valves also provides for seamless pumping of fluid mixes that contain large aggregates.

It is noted that the rotation action of the valve sets can be achieved directly by rotating cam-follower apparatuses or separate motors can provide the rotation action. The advantage of the latter arrangement is that the speed of rotation can be set independently of the speed of reciprocation.

It is further noted that a pump can be designed using the same configuration but without rotation action of the check valve sets. The design in this case would benefit from the large openings that the check valve sets offer. However, the advantages of rapid valve response and large aggregate handing, both of which are offered by the rotation action, would not be obtained.

The above disclosure and examples provide a description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the devices are not intended to be limited to the particular forms disclosed. Rather, they include all modifications and alternatives falling within the scope of the claims, and embodiments other than the one shown may include some or all of the features of the depicted embodiment. For example, components may be omitted or combined as a unitary structure, and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments. The claims are not intended to include, and should not be interpreted to include, means-plus- or step-plus-function limitations, unless such a limitation is explicitly recited in a given claim using the phrase(s)"means for" or "step for," respectively.

As it relates to the 3D printing application, the disclosed pumps may be made at two scales of large and small. The large version can serve as a regular ground pump (either in vertical or in horizontal orientation) that receives the material from a mixer and pumps it through a hose to the 3D printing nozzle site. In this configuration, the material that exits a long hose is not necessarily regulated with respect to flow consistency because concrete contains a significant amount of air, which is primarily generated at the mixing stage and that makes concrete a compressible fluid. Accordingly, when the ground pump stops, the material would keep oozing out the hose outlet and the flow stops after a few seconds or even minutes. Also, when the ground pump starts pumping, it may take a while before the pressure builds up in the hose to overcome the static friction of the abrasive fluid with the hose inner wall, thereby resulting in sudden squirting of the material moments after the pump starts running. Furthermore, even during continuous material flow, the rate of flow may keep varying depending on the condition of hose curves, which may constantly change during nozzle movement in the 3D work envelope of the printer robot, hence impacting the material friction in the hose.

To remedy the above issues, a buffer, such as a small reservoir, could be used to store a predetermined amount of material that is received from the ground pump. A smaller version of the disclosed pumps may then be used to take in the material form the small reservoir and pump it through the nozzle with accurate flow regulation and instantaneous on-demand flow start/stop. The ground pump can be automatically turned on and off using feedback received from a sensor that monitors the level of concrete within the small reservoir. When the reservoir nears overflowing, the pump can be stopped and only restarted once the material level reaches a predetermined lower threshold. A sensor could be used to detect the level of concrete in the small reservoir.

The invention claimed is:

1. A hollow-core auger pump comprising:

a rotatable shaft;

a hollow-core auger mounted to the rotatable shaft, the hollow-core auger including one or more helical hollow-core blades, wherein each helical hollow-core blade extends between a first mounting element and a second mounting element, the first mounting element being attached to a distal end of the rotatable shaft, wherein the one or more helical hollow-core blades do not include an axial core and therefore define a central open space; and a conduit in which the rotatable shaft and the hollow-core auger are contained;

wherein the hollow-core auger is configured to be angularly rotated about a longitudinal axis of the rotatable shaft and linearly reciprocated along an axial direction of the conduit in a manner in which the hollow-core auger is alternately moved in a first direction along the conduit and in a second, opposite direction along the conduit;

wherein the hollow-core auger pump is capable of reliably pumping viscous material through and out of the conduit.

2. The pump of claim 1, wherein the first mounting element is configured as an open ring having one or more spokes that extend radially inward from the one or more helical hollow-core blades to the rotatable shaft.

3. The pump of claim 1, wherein a radius of each helical hollow-core blade decreases from the first mounting element toward the second mounting element.

4. The pump of claim 1, further comprising a cam-follower apparatus configured to linearly reciprocate the hollow-core auger.

5. A hybrid auger-piston pump comprising:

a rotatable shaft;

a hybrid auger-piston mounted to the rotatable shaft, the hybrid auger-piston including an auger blade having a leading edge, a trailing edge, and an integrated check valve associated with the trailing edge, wherein the integrated check valve includes a pivotable flap that can pivot between an open orientation in which a space between the leading edge and the trailing edge of the auger blade is open and a closed orientation in which the space between the leading edge and the trailing edge of the auger blade is closed; and a conduit in which the rotatable shaft and the hybrid auger-piston are contained;

wherein the hybrid auger-piston is configured to be angularly rotated about a longitudinal axis of the rotatable shaft and linearly reciprocated along an axial direction of the conduit in a manner in which the hybrid auger-piston is alternately moved in a first direction along the conduit and in a second, opposite direction along the conduit, wherein the integrated check valve opens when the hybrid auger-piston is moved in the first direction and closes when the hybrid auger-piston is moved in the second direction so that the hybrid auger-piston alternately functions as a conventional auger and a conventional piston;

wherein the hybrid auger-piston pump is capable of reliably pumping viscous material through and out of the conduit.

6. The pump of claim 5, wherein the auger blade passes through a single 360 degree rotation.

7. The pump of claim 5, wherein the pivotable flap is pivotably mounted to the trailing edge of the auger blade.

8. The pump of claim 5, wherein a trailing edge of the pivotable flap abuts the auger blade near the leading edge of the auger blade when the pivotable flap is in the closed orientation.

9. The pump of claim 5, wherein the pivotable flap automatically pivots into its open orientation and the hybrid auger-piston collects material when the hybrid auger-piston is angularly rotated and linearly displaced upstream within the conduit, and wherein the pivotable flap automatically pivots into the closed orientation and the hybrid auger-piston displaces material downstream through the conduit when the hybrid auger-piston is linearly displaced downstream within the conduit.

10. The pump of claim 5, wherein the rotatable shaft is an outer rotatable shaft and further comprising an inner rotatable shaft concentrically positioned within the outer rotatable shaft, and wherein the hybrid auger-piston is an upstream hybrid auger-piston mounted to the outer rotatable shaft and further comprising a downstream hybrid auger-piston mounted to the inner rotatable shaft, wherein both rotatable shafts are configured to angularly rotate and at least one of the rotatable shafts is also configured to alternately linearly reciprocate in a manner in which at least one of the hybrid auger-pistons is alternately moved toward and away from the other hybrid auger-piston.

11. A multi-valve piston pump comprising:

a rotatable shaft;

a multi-valve piston mounted to the rotatable shaft, the multi-valve piston being formed by multiple check valves, each check valve being configured as a pivotable partially circular flap, wherein each check valve can pivot between an open orientation in which material can pass through the check valve and a closed orientation in which material cannot pass through the check valve; and a conduit in which the rotatable shaft and the multi-valve piston are contained;

wherein the multi-valve piston pump is capable of reliably pumping viscous material through and out of the conduit.

12. The pump of claim 11, wherein each pivotable partially circular flap is pivotally mounted on a pivot axle that extends radially outward from the rotatable shaft.

13. The pump of claim 11, wherein the rotatable shaft is an outer rotatable shaft and further comprising an inner rotatable shaft concentrically positioned within the outer rotatable shaft, and wherein the multi-valve piston is an upstream multi-valve piston mounted to the outer rotatable shaft and further comprising a downstream multi-valve piston mounted to the inner rotatable shaft, wherein both rotatable shafts are configured to angularly rotate and at least one of the rotatable shafts is configured to alternately linearly reciprocate in a manner in which at least one of the multi-valve pistons is alternately moved toward and away from the other multi-valve piston.

14. The pump of claim 11, wherein when each check valve is in its closed orientation, the check valves together form a substantially planar disc operable as a piston that can drive material through the conduit.

15. The pump of claim 14, wherein the multi-valve piston is configured to be angularly rotated about a longitudinal axis of the rotatable shaft and linearly reciprocated along an axial direction of the conduit in a manner in which the multi-valve piston is alternately moved in an upstream direction within the conduit and in a downstream direction within the conduit, wherein the check valves automatically open when the multi-valve piston is moved in the upstream direction so that the multi-valve piston collects material and the check valves automatically close when the multi-valve piston is moved in the downstream direction so that the multi-valve piston displaces material downstream through the conduit.

16. The pump of claim 14, wherein each check valve nests with at least one adjacent check valve when the check valves are in the closed orientation.

* * * * *